July 7, 1959   H. C. MAY   2,893,752
CONTROL VALVE DEVICE FOR VEHICLE AIR SPRINGS
Filed Dec. 16, 1957
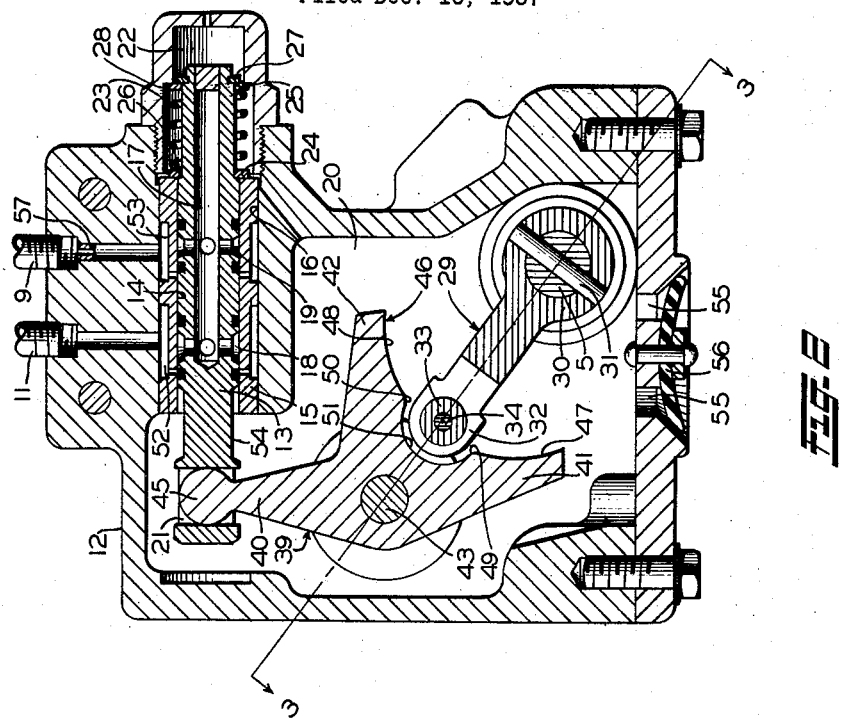
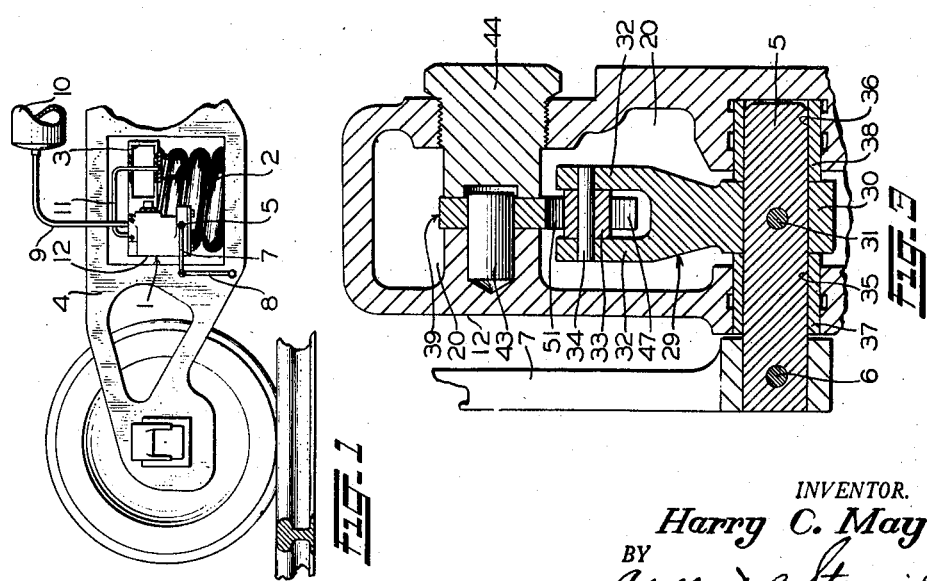
INVENTOR.
Harry C. May
BY
Adelbert A. Steinmiller
ATTORNEY United States Patent Office 2,893,752
Patented July 7, 1959

2,893,752

CONTROL VALVE DEVICE FOR VEHICLE AIR SPRINGS

Harry C. May, East McKeesport, Pa., assignor to Westinghouse Air Brake Company, Wilmerding, Pa., a corporation of Pennsylvania Application December 16, 1957, Serial No. 703,013

5 Claims. (Cl. 280—124)

This invention relates to control valve devices for so controlling pressure of fluid in an air spring interposed between a sprung portion and an unsprung portion of a vehicle as to support the sprung portion at a substantially constant preselected height relative to the unsprung portion irrespective of the load carried by the sprung portion.

According to the invention, there is provided a control valve device of the above general type comprising a cam rockably carried by the sprung portion and having two spaced effective surfaces separated by a recess in which a cam actuator is normally disposed. This cam actuator is arcuately movable by being operably connected to a shaft that is journalled on the sprung portion and is rotatable reversibly by suitable linkage (such as a link hingedly connected to the unsprung portion and pivotally connected to a connecting rod that is rotatively connected to said shaft) according to whether the sprung portion is raised or lowered relative to the unsprung portion, as by variations in load on the sprung portion. The aforementioned linkage is responsive to an increase in load on the sprung portion to rotate the shaft one way and thereby cause the cam actuator to be carried arcuately into engagement with one of said effective cam surfaces to rock the cam in one direction to operatively shift a reversely shiftable spool-type valve to a supply position for supplying fluid under pressure to the air spring; and said linkage is responsive to a decrease in load on the sprung portion to rotate said shaft the other way and thereby cause the cam actuator to be carried into engagement with the other of said effective surfaces to rock said cam in the opposite direction to operatively shift said valve to a release position for exhausting fluid under pressure from the air spring. While the cam actuator is disposed in the recess between the effective surfaces of the cam, the cam will be so positioned as to cause the valve to assume a lap position in which it bottles up fluid under pressure in the air spring. The width of said recess is sufficiently greater than that of said cam actuator so that when the sprung portion oscillates vertically within normal limits during movement of the vehicle in a substantially horizontal path at a time while load remains constant, said cam actuator will be rocked by said shaft within said recess without effectively engaging either of said effective surfaces, thereby causing fluid under pressure to be maintained bottled up in the air spring unless there is an actual change in load.

Other features and advantages of the improved control valve device will become apparent from the following more detailed description thereof and from the accompanying drawing, wherein Fig. 1 is an elevational view partly in section, of a control valve device embodying the invention shown associated with a sprung and unsprung portion of a vehicle and a source of fluid supply; Fig. 2 is an enlarged vertical sectional view of the control valve device shown in outline in Fig. 1; and Fig. 3 is a sectional view taken along the line 3—3 of Fig. 2.

Description

Referring to Fig. 1 of the drawing, a control valve device 1 embodying the invention is shown for controlling pressure of fluid in an air spring 2 that at its upper end operatively bears against a sprung portion, such as a bolster 3, of a railway vehicle, and at its lower end operatively bears against an unsprung portion, such as a truck side-frame 4, of said vehicle, so as to cause said air spring to maintain said sprung portion at a constant substantial height relative to the unsprung portion. The casing of valve device 1 is bolted to the bolster 3 and has journalled therein a horizontally disposed rotary shaft 5. Shaft 5 is secured by a pin 6 (Figs. 2 and 3) to one end of a rod 7 which at its opposite end is pivotally connected to one end of a link 8, that, in turn, at its opposite end is hingedly connected by a horizontally disposed pin to the truck side-frame 4. Shaft 5 is rotated reversely according to whether the bolster 3 is raised or lowered relative to the side-frame 4. Connected to the valve device 1 are a fluid pressure supply pipe 9 leading to a supply reservoir 10 and a delivery pipe 11 leading to the air spring 2.

As shown in Figs. 2 and 3, control valve device 1 comprises a sectionalized casing 12 in which is contained a balanced spool-type valve 13 sealingly and slidably reciprocable in a bore 14 of a bushing 15 that is press-fit into a casing bore 16. A central bore in valve 13 is plugged at its open end to define a cylindrical chamber 17 within the valve which is constantly open via a plurality of radial ports to two spaced annular cavities 18, 19 formed in the periphery of valve 13. Near one end of valve 13 which extends into an exhaust chamber 20 is a vertical slot 21 elongated in an axial direction; and adjacent its opposite end, said valve has a reduced diameter portion that extends into an atmospheric chamber 22.

A helical spring 23 surrounds the reduced diameter portion of valve 13 and is interposed between and bears against two spring retainer rings 24, 25. Spring 23 tends to force these rings 24, 25 apart into contact, respectively, with a radial shoulder 26 on valve 13 and a retaining ring 27 carried in an annular groove encircling valve 13. When no axial force is being applied to valve 13, the rings 24, 25 will also contact, respectively, the adjacent end of bushing 15 and an inwardly directed annular shoulder 28 formed in casing 12 in proximity of and encircling the reduced diameter portion of said valve for thereby biasing the valve 13 to a lap position, in which it is shown, and in which the spring 23 is effectively caged by operative contact at its respective ends with the immobile bushing 15 and shoulder 28.

A lever 29 disposed in chamber 20 comprises at its one end an annular portion 30 that is slipped over and staked to shaft 5 intermediate its ends by a preferably tapered pin 31 and comprises adjacent its opposite end a yoke portion 32. Between the spaced arms of yoke portion 32 is a cam actuator 33, preferably in the form of a roller, which is rotatably mounted on a pin 34 which, in turn, is carried by said arms. Shaft 5 is journalled in bores 35, 36 of respective bushings 37, 38 that are press-fit into respective bores in casing 12, and said shaft extends outwardly of casing 12 through bore 35.

A generally T-shaped cam member 39 disposed in chamber 20 has two oppositely arranged arms 40, 41 and a third arm 42 extending at substantially right angles to arms 40, 41. This cam member 39 is rockably mounted at the junction of its respective arms 40, 41, 42 on a pin 43 that is carried in an aligned bore in casing 12 and has an axis parallel to, above and at one side of the axis of shaft 5. Movement of the cam member 39 along the axis of pin 43 is prevented by an adjusting nut 44 that is screw-threaded into an opening in the casing 12 arranged coaxially opposite to the bore of pin 43 and is adjusted to provide a minimum of side clearance for the cam member 39 so that it will be constrained against axial shifting on pin 43 or cocking but freely rockable on said pin. At the outer end of arm 40 is an integrally formed disc 45 that fits into the vertical slot 21 and tends to rotate within said slot when cam member 39 is rocked on pin 43, for shifting valve 13 axially; said disc 45 by engagement with the ends of the slot 21 providing an operative connection between the cam member 39 and valve 13 which permits rocking of said cam member to effect axial movement of said valve without cocking said valve, in much the same manner as a ball-in-socket connection between the cam member 39 and valve 13.

Extending transversely between, and integrally formed with and joining the outer ends of, arms 41 and 42 of cam member 39 is a cam 46 comprising two spaced effective cam surfaces 47, 48 joined by small radii or convex curves 49, 50, respectively, to the wall of a generally semi-circular recess 51 disposed between said surfaces. The diameter of cam actuator roller 33 is substantially less than that of the recess 51 so as to permit said roller to be disposed with a certain degree of clearance within said recess without engaging the semi-circular wall thereof, for reasons hereinafter to be explained.

With the cam actuator 33 centered within the recess 51, cam surfaces 47, 48 are defined by arcs having a center intermediate the ends of a line connecting the axes of pins 43 and 31, and the wall of the recess 51 is defined by an arc having a center coincident with the axis of pin 33, such that the wall of recess 51 is of substantially shorter radius than the surfaces 47, 48.

*Operation*

Assume initially that the sprung portion of the vehicle is supported at the aforementioned preselected height relative to the unsprung portion by the air spring 2; that valve 13 of control valve device 1 is biased by spring 23 to a lap position, in which it is shown in Fig. 2, and in which supply pipe 9 is cut off from delivery pipe 11 and from exhaust chamber 20 by O-ring seals disposed about the periphery of valve 13; and that the cam actuator 33 is centered within the recess 51.

If, now, the load on the sprung portion is increased, the bolster 3 and therefore casing 12 and shaft 5 of valve device 1 will descend below the aforementioned preselected height relative to the unsprung portion. As shaft 5 moves vertically downward, connecting rod 7 will be caused to swing clockwise relative to the link 8 and thereby rotate shaft 5 and thus lever 29 clockwise for causing the latter to carry cam actuator successively through the aforementioned clearance and into engagement with the radius 50 and then onto and along cam surface 48 an extent corresponding to the degree of descent of the bolster 3; whereupon lever 29 acting through roller 33 will rock cam member 39 counterclockwise on pin 43 for causing disc 45 to shift valve 13 leftward to a supply position, in which valve cavities 18 and 19 are in registry, via suitable radial ports in bushing 15, with elongated annular cavities 52, 53, respectively, formed in the exterior of said bushing and constantly open to pipes 11, 9 respectively. Hence, with valve 13 in supply position, fluid under pressure will flow via supply pipe 9, cavities 53, 19, chamber 17, cavities 18, 52, and delivery pipe 11 to the air spring 2. As air spring pressure increases, the bolster 3 will rise and through the medium of link 8 and rod 7 rock shaft 5 and thereby lever 29 counterclockwise, with the result that cam actuator 33 will be carried back along cam surface 48 toward recess 51. By the time air spring pressure has increased sufficiently to thus operatively cause the cam actuator 33 to be driven back over the radius 50, the valve 13 will have been operatively shifted, by assistance from spring 23, to its above-defined lap position, in which supply of fluid under pressure to the air spring 2 is terminated; it being noted that the cam actuator 33 at such time will bear against the wall of recess 51 adjacent radius 50.

If the load on the sprung portion is decreased, then the bolster 3 and therefore casing 12 and shaft 5 of valve device 1 will ascend above the aforementioned preselected height relative to the unsprung portion. As shaft 5 moves vertically upward, connecting rod 7 will be caused to swing counterclockwise relative to link 8 and thereby rotate shaft 5 and thus lever 29 counterclockwise for causing the latter to carry cam actuator 33 successively through the arcuate clearance provided by recess 51 and into engagement with radius 49 and then onto and along cam surface 47 an extent corresponding to the degree of ascent of the bolster 3; whereupon lever 29 acting through cam actuator 33 will rock cam member 39 clockwise on pin 43 for causing disc 45 to shift valve 13 rightward to a release position, in which the delivery pipe 11 is open via cavity 52 and radial ports in bushing 15 to an annular cavity 54 which is formed in the periphery of valve 13 intermediate slit 21 and cavity 18 of valve 13 and is always open to the exhaust chamber 20. Hence, with valve 13 in release position, fluid under pressure will be exhausted from the air spring 2 to exhaust chamber 20 and thence by way of exhaust ports 55 in the casing 12 and a conventional vent protector 56 to the atmosphere. As air spring pressure decreases, the bolster 3 will descend and through the medium of link 8 and rod 7 rock shaft 5 and thereby lever 29 clockwise, with the result that cam actuator 33 will be carried back along surface 47 toward recess 51. By the time air spring pressure has decreased sufficiently to operatively cause cam actuator 33 to be driven back over the radius 49, valve 13 will have been operatively shifted, by assistance from spring 23, to its above-defined lap position, in which supply of fluid under pressure to the air spring 2 is terminated; it being noted that the cam actuator 33 at such time will bear against the wall of recess 51 adjacent radius 49.

During movement of the vehicle in a substantially horizontal path, the bolster 3 will generally oscillate vertically or "bounce" a slight degree due to unevenness of the track bed or roadway. If we assume now that cam actuator 33 is in engagement with the wall of recess 51 adjacent the radius 50, as will be the case immediately after the valve device 1 has responded to an increase in load on the bolster 3 and increased the pressure of fluid in the air spring 2, then during the first "bounce" downward of the bolster 3 following such operation of the valve device 1, the cam actuator 33 will roll up past radius 50 with the result that valve 13 will be operatively shifted by cam member 39 to a supply position and admit a "shot" of fluid under pressure to the air spring 2 and thus tend to dampen out the bounce. Since the position of the cam actuator 33 is controlled by movement of the bolster 3 relative to the side-frame 4, it will be seen that after the bolster 3 has bounced several times, and valve 13 has supplied several "shots" of fluid under pressure to the air spring 2 and thereby slightly raised the bolster 3, the cam actuator 33 will tend to assume, and thereafter swing equal distances in opposite directions from, a mid position between the radii 49, 50. The distance between radii 49 and 50 is sufficiently greater than the diameter of the roller-type cam actuator 33 to permit the latter to repeatedly move arcuately out of its mid position without effectively engaging the radii 49, 50 or the surfaces 47, 48 so long as the bolster 3 oscillates within normal limits, thereby preventing unnecessary and undesirable continuous operation of valve 13 to supply and release fluid under pressure from the air spring 2.

Conversely, if the cam actuator 33 is in engagement with the wall of recess 51 adjacent the radius 49, as will be the case immediately after the valve device 1 has responded to a decrease in load on the bolster 3 and decreased the pressure of fluid in the air spring 2, then during the first "bounce" upward of the bolster 3 following such operation of the valve device 1 the cam actuator 33 will roll down past radius 49 with the result that fluid under pressure in the air spring 2 will be reduced a slight degree. Thus, after several upward bounces, bolster 3 will fall below the level maintained before the "bouncing" began and thus cause cam actuator 33 to be moved to its above-defined mid position in recess 51; whereupon during further bouncing of the bolster 3 within the aforementioned normal limits, the valve 13 will be maintained in lap position for bottling up fluid under pressure in the air spring 2, as more fully described above.

The configuration of the cam 46 preferably is such that the valve 13 is opened and closed primarily by rolling of cam actuator 33 over radius 50 or radius 49, respectively, and once said cam actuator is completely on surface 48 or 47 only very slight further leftward or rightward movement, respectively, of said valve will occur as said cam actuator moves further away from said recess, for thereby maintaining the valve 13 under operative control of the lever 29 at all times when the cam actuator is not disposed within the recess 5. With a configuration of the cam 46, as just described, it will be noted that the spring 23 may, if desired, be eliminated.

A choke 57 is preferably interposed between the supply reservoir 10 and valve cavity 19 to provide a restricted rate of supply of fluid under pressure from said reservoir to the air spring 2 when valve 13 is in supply position; and the exhaust communication 11, 52, 54 via which the air spring 2 is vented to exhaust chamber 20 is preferably unrestricted to provide a substantially unrestricted rate of release of air spring pressure when valve 13 is in release position.

Having now described the invention, what I claim as new and desire to secure by Letters Patent, is:

1. A control valve device for so controlling pressure of fluid in an air spring interposed between a sprung portion and an unsprung portion of a vehicle as to support the sprung portion at a substantially constant preselected height relative to the unsprung portion irrespective of the load carried by the sprung portion, said control valve device comprising casings means secured to the sprung portion, valve means reciprocably mounted in said casing means for controlling pressure of fluid in the air spring, cam means rockably carried within said casing means for controlling operation of said valve means and having two spaced effective surfaces separated by a recess, cam actuator means journalled within said casing means and normally disposed within said recess and controlling rocking of said cam means, said cam actuator means, so long as it is disposed within said recess, being ineffective to rock said cam means out of a position in which it causes said valve means to operate to bottle up fluid under pressure in the air spring, link means operatively connecting the unsprung portion with said cam actuator means and moved responsively to an increase in load on the sprung portion to rock said cam actuator means into engagement with one of said effective surfaces for causing said cam means to rock so as to cause said valve means to supply fluid under pressure to the air spring, and moved responsively to a decrease in load on the sprung portion to rock said cam actuator means into engagement with the other of said effective surfaces for causing said cam means to rock so as to cause said valve means to release fluid under pressure from the air spring, the last-named means being operative to reversibly rock said cam actuator means within said recess when the sprung portion oscillates vertically during movement of the vehicle in a substantially horizontal path at a time while load remains constant, for thereby causing fluid under pressure to be maintained bottled up in the air spring unless there is an actual change in load on the sprung portion.

2. A control valve device for so controlling pressure of fluid in an air spring interposed between a sprung portion and an unsprung portion of a vehicle as to support the sprung portion at a substantially constant preselected height relative to the unsprung portion, said control valve device comprising casing means secured to the sprung portion of the vehicle, a reversibly rotatable shaft journalled in said casing means, link means operatively connecting said shaft to the unsprung portion of the vehicle for causing said shaft to rotate in one direction or the opposite direction according to whether the sprung portion is descending or ascending relative to the unsprung portion, cam means rockably mounted in said casing means and having two spaced effective surfaces, cam actuator means operatively connected to said shaft and arcuately movable on a uniform radius of curvature in said one direction and opposite direction by said shaft for respectively engaging one or the other of said effective surfaces and normally disposed within a recess between said effective surfaces, valve means operatively connected to and shiftable reversely by said cam means and carried by said casing means for controlling pressure of fluid in the air spring, said valve means being operative responsively to engagement of said cam actuator means with said one effective surface or said other effective surface to respectively supply fluid under pressure to or to release fluid under pressure from the air spring, said valve means being operative when said cam actuator means is within said recess and is disengaged from both of said effective surfaces to bottle up fluid under pressure in the air spring, the width of said recess being sufficiently greater than that of said cam actuator means so that when the sprung portion oscillates vertically within normal limits during movement of the vehicle in a substantially horizontal path at a time while load remains constant, said cam actuator means will be rocked by said shaft within said recess without effectively engaging either of said effective surfaces so as to thereby cause fluid under pressure to be maintained bottled up in the air spring unless there is an actual change in load.

3. A control valve device according to claim 2, including means for resiliently biasing said valve means to the position in which it bottles up fluid under pressure in the air spring.

4. A control valve device for so controlling pressure of fluid in an air spring interposed between a sprung portion and an unsprung portion of a vehicle as to support the sprung portion at a substantially constant preselected height relative to the unsprung portion irrespective of the load carried by the sprung portion, said control valve device comprising casing means secured to the sprung portion, a spool-type valve disposed within said casing means and normally in a lap position in which it bottles up fluid in the air spring and shiftable therefrom in one direction to a supply position to supply fluid under pressure to the air spring and shiftable therefrom in the opposite direction to a release position to exhaust fluid under pressure from the air spring, two spaced retaining rings slidably mounted about said valve, a spring interposed between said retaining rings and normally biasing said rings into contact with spaced shoulders provided by said casing means for defining said lap position of said valve, one of said retaining rings being held stationary by contact with one of said shoulders upon movement of said valve to its supply position for causing compression of said spring in one direction and the other of said rings being held stationary by contact with the other of said shoulders upon shifting of said valve to said release position for causing compression of said spring in the opposite direction, such that said spring is effective to bias said valve from its supply position and its release position to said lap position, a cam member rockably carried by and within said casing means and comprising two spaced effective cam surfaces having a recess therebetween, said cam member also comprising an arm operatively connected to said valve, a reversibly rotatable shaft journalled in said casing means, a lever secured to said shaft and movable arcuately upon rotation of said shaft, a roller-type cam actuator carried by said lever adjacent the end thereof remote from said shaft, a connecting rod rotatively connected to said shaft, and link means hingedly connected to the unsprung portion and pivotally connected to said connecting rod, said link means and connecting rod being responsive to the ascent or the descent of the sprung portion relative to the unsprung portion to rotate said shaft one way or the opposite way for arcuately moving said cam actuator through said recess and into engagement with one or the other of said cam surfaces to thereby so rock said cam member and thereby its said arm as to shift said valve from its lap position to its release position or to its supply position, respectively, for controlling pressure of fluid in the air spring, said cam actuator so long as it is disposed within said recess being ineffective to operatively shift said valve from its lap position.

5. A control valve device according to claim 4, wherein the width of said recess is sufficiently greater than the diameter of said roller-type cam actuator so that when the sprung portion oscillates vertically within normal limits during movement of the vehicle in a substantially horizontal path at a time while load remains constant, said cam actuator will be rocked by said shaft within said recess without effectively engaging either of said effective surfaces so as to thereby cause fluid under pressure to be maintained bottled up in the air spring unless there is an actual change in load.

References Cited in the file of this patent

UNITED STATES PATENTS

| | | |
|---|---|---|
| 1,020,076 | Bowser | Mar. 12, 1912 |
| 1,179,015 | McCrosson | Apr. 11, 1916 |
| 1,371,648 | Schmidt | Mar. 15, 1921 |

FOREIGN PATENTS

| | | |
|---|---|---|
| 1,098,063 | France | Mar. 2, 1955 |